United States Patent
Pancotti

(10) Patent No.: US 8,573,935 B2
(45) Date of Patent: Nov. 5, 2013

(54) HELICOPTER ROTOR COMPRISING A VIBRATION DAMPER, AND METHOD FOR UPDATING THE SAME

(75) Inventor: Santino Pancotti, Gallarate (IT)

(73) Assignee: Agusta S.p.A., Samarate (IT)

( * ) Notice: Subject to any disclaimer, the term of this patent is extended or adjusted under 35 U.S.C. 154(b) by 897 days.

(21) Appl. No.: 12/665,303

(22) PCT Filed: Jun. 19, 2008

(86) PCT No.: PCT/IB2008/001594
§ 371 (c)(1), (2), (4) Date: Mar. 23, 2010

(87) PCT Pub. No.: WO2008/155632
PCT Pub. Date: Dec. 24, 2008

(65) Prior Publication Data
US 2010/0183442 A1  Jul. 22, 2010

(30) Foreign Application Priority Data

Jun. 20, 2007  (IT) .............................. TO2007A0442

(51) Int. Cl.
*B64C 27/32* (2006.01)
(52) U.S. Cl.
USPC .............................. 416/1; 416/145; 416/500
(58) Field of Classification Search
USPC .......... 415/119; 416/1, 144, 145, 244 R, 500; 244/17.27, 17.25
See application file for complete search history.

(56) References Cited

U.S. PATENT DOCUMENTS 3,921,940 A * 11/1975 Mouille ..................... 244/17.27
4,255,084 A *  3/1981 Mouille et al. ................ 416/145
4,403,681 A *  9/1983 Desjardins .................... 188/379
6,045,090 A *  4/2000 Krysinsky et al. ......... 244/17.27

FOREIGN PATENT DOCUMENTS

FR  2 749 901  12/1997
GB  2 014 099   8/1979

OTHER PUBLICATIONS

International Search Report, Int'l. Appl. No. PCT/IB2008/001594 dated Nov. 6, 2008.

* cited by examiner

*Primary Examiner* — Edward Look
*Assistant Examiner* — William Grigos
(74) *Attorney, Agent, or Firm* — McCracken & Frank LLC

(57) ABSTRACT

A rotor for a helicopter, having: a hub rotating about an axis and in turn having a number of blades; and an at least partly hollow drive shaft connectable to a drive of the helicopter and connected functionally to the hub to rotate the hub about the axis; the rotor also having vibration damping means in turn having a mass, and an elastically deformable member connected to the mass and supported by the shaft; the member extending at least partly inside the shaft, and being elongated parallel to the axis; and the mass vibrating, in use, at such a frequency as to oppose transmission to the shaft of the vibration produced by rotation of the hub and blades.

10 Claims, 2 Drawing Sheets

HELICOPTER ROTOR COMPRISING A VIBRATION DAMPER, AND METHOD FOR UPDATING THE SAME

FIELD OF THE INVENTION

The present invention relates to a helicopter rotor comprising a vibration damper, and method for updating the same.

BACKGROUND OF THE INVENTION

Helicopters are known which substantially comprise a fuselage; a main rotor on top of the fuselage and rotating about a respective axis; a tail rotor at the end of the fuselage; two horizontal tail surfaces; and two vertical tail surfaces.

More specifically, the rotor substantially comprises a hub rotating about said axis and having a number of blades fixed to and projecting radially from the hub; and a drive shaft connectable to a drive and connected functionally to, to rotate, the hub.

Rotation of the rotor produces high- and low-frequency vibration. More specifically, low-frequency vibration is produced by the wash from the blades and from the centre of the hub striking the vertical and horizontal tail airfoils and the tail rotor itself.

To reduce low-frequency vibration, the rotor comprises a flow deflector fitted to the top centre of the rotor and extending annularly about the rotor rotation axis.

More specifically, the flow deflector is designed to direct flow produced by the rotor in such a manner as to reduce the wash effect and prevent the wash from striking the tail rotor and relative supporting structures.

High-speed rotation of the blades also produces high-frequency vibration, which is transmitted to the drive shaft and therefore to the helicopter.

A need is felt within the industry to reduce generation and transmission of high-frequency vibration to the drive shaft of the rotor, by means of dampers fitted to the rotor and tuned to one or more of the above vibration frequencies. More specifically, a need is felt for compact dampers involving no alteration to the other component parts of the rotor.

A need is also felt within the industry for dampers which, in the event of detachment from the rotor, do not strike, thus producing irreparable damage to, the hub or blades.

Finally, a need is felt within the industry for dampers that do not interfere with the streamline profile of the helicopter or flow deflector, and therefore do not affect airflow induced by the main rotor on the tail rotor and tail airfoils.

SUMMARY OF THE INVENTION

It is an object of the present invention to provide a helicopter rotor designed to provide a straightforward, low-cost solution to at least one of the above requirements.

According to the present invention, there is provided a helicopter rotor as claimed in Claim 1.

The present invention also relates to a method for updating a helicopter rotor, as claimed in Claim 11.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
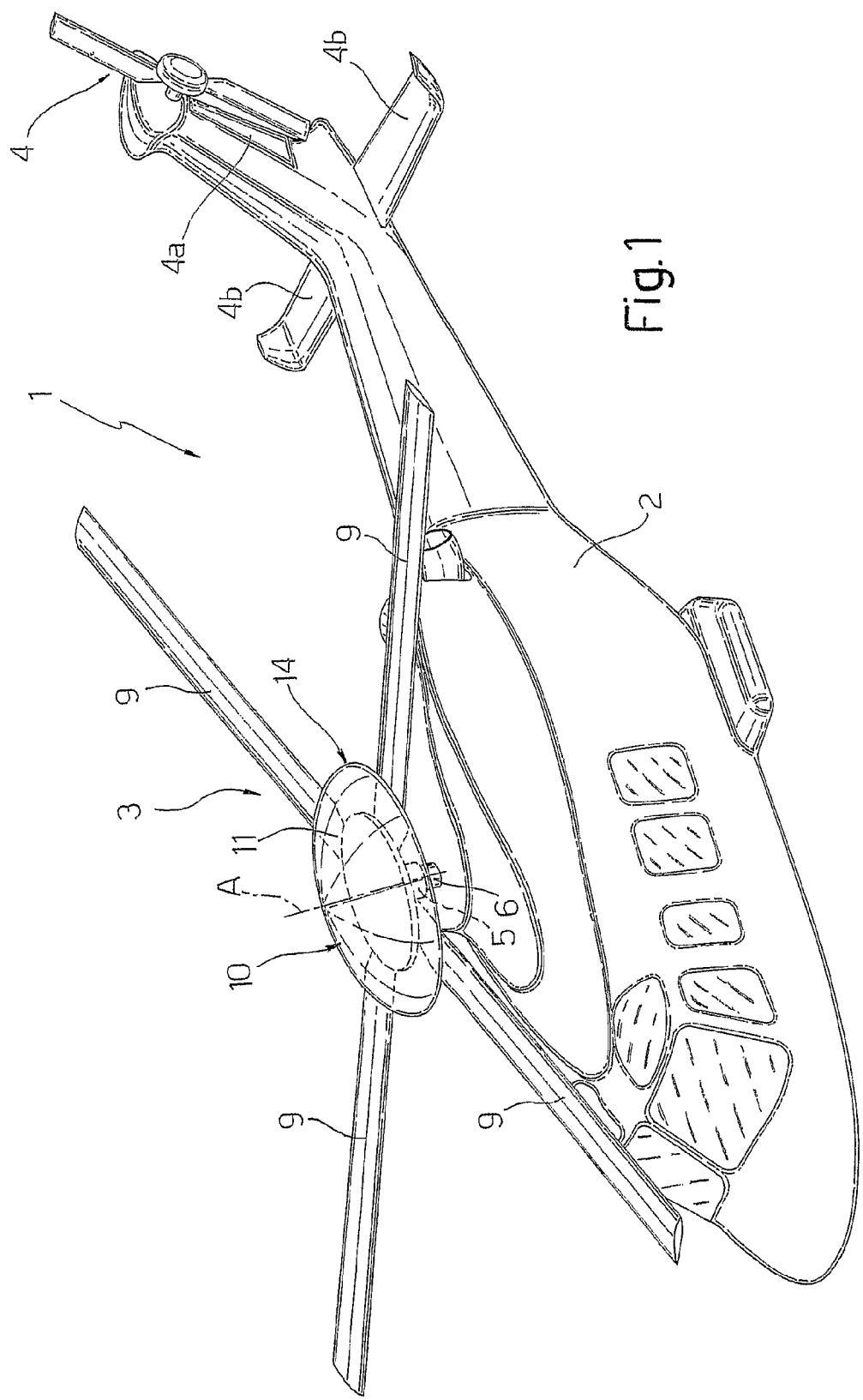
FIG. 1 shows a side view of a helicopter comprising a rotor in accordance with the present invention.

Number 1 in FIG. 1 indicates a helicopter substantially comprising a fuselage 2; a main rotor 3 on top of fuselage 2 and rotating about an axis A; a tail rotor 4 at the end of fuselage 2 and rotating about an axis crosswise to axis A; two vertical tail surfaces 4a; and two horizontal tail surfaces 4b.

More specifically, rotor 3 comprises a hollow hub 5, of axis A, supporting a number of blades 9 projecting radially with respect to axis A.

Rotor 3 also comprises a hollow drive shaft 6 rotating about axis A, angularly integral with hub 5, and connected in a manner not shown to a drive, e.g. a turbine, on helicopter 1.

Figure 2:
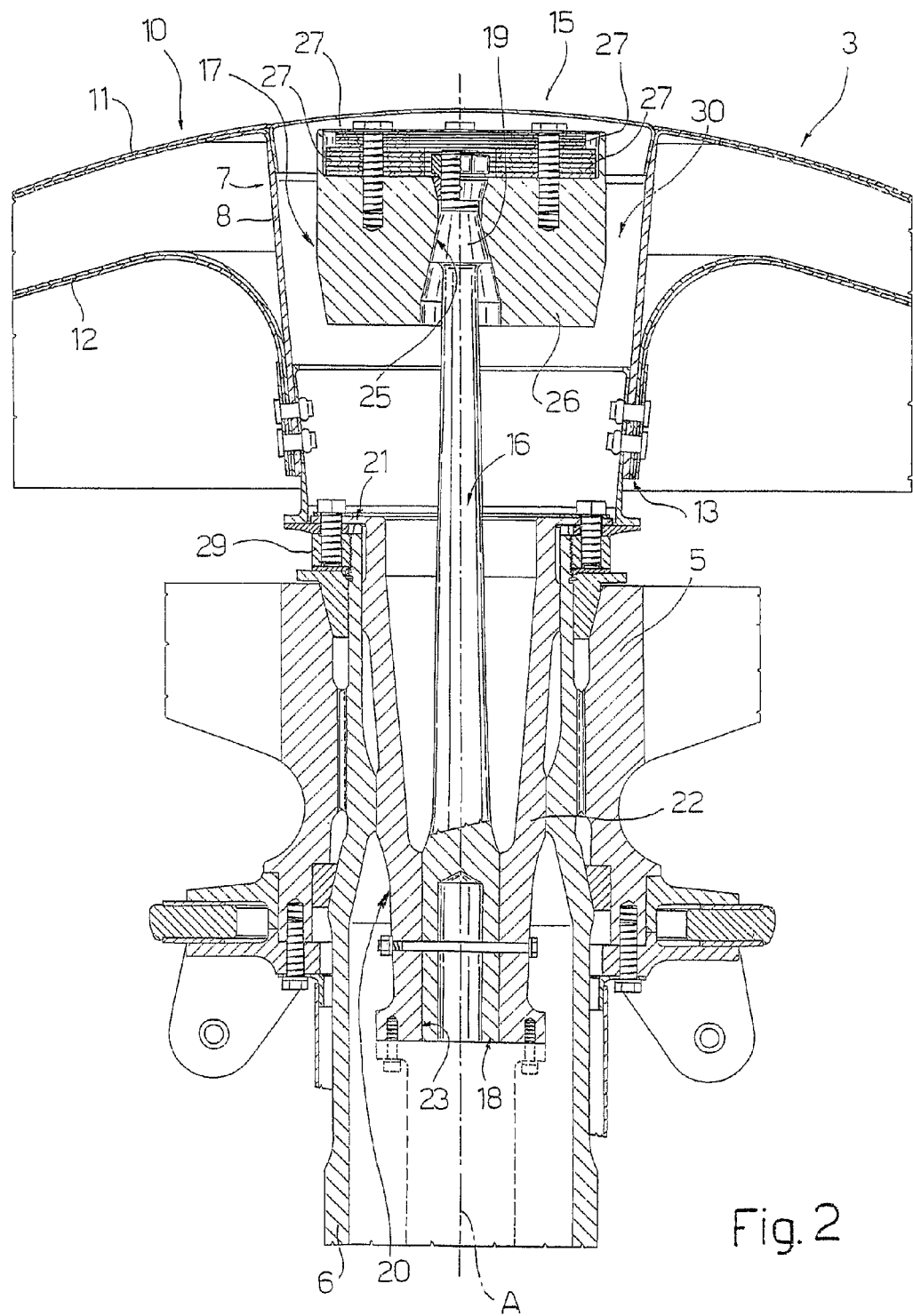
FIG. 2 shows a section of the FIG. 1 rotor, with some parts only shown partly for the sake of clarity.

More specifically (FIG. 2), shaft 6 is housed partly inside hub 5, and is connected angularly integral with hub 5 by a splined profile and two wedges interposed radially between shaft 6 and hub 5. More specifically, the splined profile is interposed axially between the wedges.

Rotor 3 also comprises a flow deflector 10 for guiding the flow produced by rotation of rotor 3 along a predetermined path designed to reduce vibration caused by detachment of said flow from the ends of blades 9 opposite hub 5.

More specifically, deflector 10 is annular, extends about axis A, and is located on the opposite side of hub 5 to fuselage 2.

Deflector 10 is "cap-shaped" and bounded by two axially facing walls 11, 12. More specifically, wall 11 defines deflector 10 axially on the opposite side to hub 5, and wall 12 defines deflector 10 axially on the same side as hub 5.

Wall 11 is continuous, and, working radially outwards of axis A, extends at decreasing axial distances from hub 5.

Wall 12 has a circular first peripheral edge 13; and a second peripheral edge (not shown in FIG. 2) opposite and radially outwards of peripheral edge 13, and which axially faces a peripheral edge 14 (FIG. 1) of wall 11.

Walls 11, 12 are designed so that the axial distance between them decreases, working radially outwards of axis A.

More specifically, from edge 13 to the second edge, wall 12 first extends away from hub 5 and then towards hub 5.

Walls 11, 12 are connected to each other by a truncated-cone-shaped tubular body 7 symmetrical with respect to axis A and having a lateral surface 8 extending between walls 11, 12.

Surface 8 tapers towards wall 12.

Rotor 3 advantageously comprises a vibration damper 15, in turn comprising a mass 17 and an elastically deformable rod 16. Rod 16 is fitted to shaft 6, is connected to mass 17, extends at least partly inside shaft 6, and is elongated parallel to axis A; and mass 17 vibrates, in use, at such a frequency as to oppose transmission to shaft 6 of the vibration produced by rotation of hub 5 and blades 9.

More specifically, the flexural rigidity of rod 16 in a plane perpendicular to axis A, and the size of mass 17 are such that mass 17 vibrates, in use, at a predetermined frequency value associated with at least one frequency value characteristic of the vibration produced by rotation of rotor 3.

In other words, damper 15 is tuned to the frequency of the vibration produced by rotor 3, and exerts such force on shaft 6 as to oppose transmission of said vibration to shaft 6 and, therefore, to helicopter 1.

Damper 15 is housed inside a cavity 30 bounded radially by shaft 6 and surface 8, and bounded axially, at the opposite end to fuselage 2, by the portion of wall 11 extending between wall 8.

Cavity 30 is designed to isolate damper 15 from hub 5 and blades 9, and so prevent damper 15 from striking hub 5 and/or blades 9, in the event of detachment of damper 15 from shaft 6.

Rotor 3 also comprises a cup-shaped body 20, of axis A, angularly integral with shaft 6 and rod 16, and for mutually connecting shaft 6 and rod 16.

More specifically, cup-shaped body 20 is tubular, extends symmetrically about axis A, and is located radially outwards of rod 16.

Cup-shaped body 20 comprises a main portion 22 surrounded by shaft 6 and elongated parallel to axis A; and an annular end surface 21 in a plane perpendicular to axis A.

At the opposite end to end surface 21, main portion 22 defines a seat 23 engaged by an axial end 18 of rod 16. More specifically, end 18 is hot force fitted inside seat 23.

End surface 21 is fitted axially, by means of a number of screws, to a threaded ring nut 29 fitted to shaft 6, and is fitted through with rod 16.

End surface 21 defines an axial end of cup-shaped body 20 facing deflector 10; and seat 23 is located at an axial end of cup-shaped body 20 opposite end surface 21.

Seat 23 and end 18 are fitted through with a threaded tie extending perpendicular to axis A.

Cup-shaped body 20 is preferably made of light alloy.

Rod 16 comprises a truncated-cone-shaped end 19 opposite end 18 and inserted inside a truncated-cone-shaped seat 25 defined by mass 17, to fix rod 16 to mass 17.

Rod 16 also comprises an intermediate portion, between ends 18 and 19, which tapers from end 18 to end 19 and extends through end surface 21.

End 18 of rod 16 is housed inside shaft 6.

Rod 16 is housed completely inside the cylinder defined by the extension of shaft 6 towards deflector 10.

Mass 17 is housed inside deflector 10. More specifically, mass 17 is housed inside a cavity bounded radially by surface 8, open axially at the end facing hub 5, and closed axially, at the opposite end to hub 5, by the portion of wall 11 extending between wall 8.

Mass 17 comprises a main body 26 defining seat 25; and a number of plates 27 connected releasably to main portion 26 to adjust the vibration frequency of mass 17 and therefore the tuning frequency of damper 15.

Plates 27 are defined by superimposed rings coaxial with axis A and lying in respective planes perpendicular to axis A.

Plates 27 are packed together and fitted to main portion 26 by a number of screws.

In actual use, shaft 6 rotates hub 5, blades 9 and damper 15 about axis A.

Rotation of hub 5 and blades 9 produces vibration which is transmitted to shaft 6 and by this to helicopter 1.

Rotation of damper 15 vibrates mass 17, by virtue of the elasticity of rod 16. More specifically, mass 17 rotates about axis A, and vibrates preponderantly in a plane perpendicular to axis A.

By virtue of the design of rod 16 and mass 17, the vibration frequency of mass 17 is tuned to one of the frequencies of the vibration induced by rotation of rotor 3.

Damper 15 therefore acts on shaft 6 in such a way as to oppose transmission of said vibration to shaft 6 and, from this, to helicopter 1.

Damper 15 can be installed easily on an existing rotor 3 comprising hub 5, shaft 6, and blades 9, to update rotor 3.

This is done by simply fixing cup-shaped body 20 to shaft 6, fixing rod 16 to cup-shaped body 20, and fixing mass 17 to rod 16.

The advantages of rotor 3 and the updating method according to the present invention will be clear from the above description.

In particular, damper 15 rotates integrally with shaft 6 about axis A, and has no masses rotating eccentrically with respect to axis A, or hinge points to shaft 6 and/or hub 5.

Damper 15 is therefore perfectly balanced dynamically with respect to axis A, and produces no further critical speeds of rotor 3 in use.

Damper 15 also provides simply and cheaply for reducing transmission of vibration to shaft 6, without interfering with streamlining or operation of rotor 3 and/or deflector 10.

In fact, rod 16 being housed at least partly inside shaft 6 and extending parallel to axis A, damper 15 is highly compact radially, and fits within the radial size of shaft 6.

As a result, damper 15 in no way interferes radially with correct operation of deflector 10, hub 5, or blades 9.

More specifically, damper 15 in no way interferes with airflow directed onto rotor 4 by rotation of rotor 3.

In addition, damper 15 is housed completely inside cavity 30 defined by shaft 6 and deflector 10.

Therefore, in the event of detachment of rod 16 from cup-shaped body 20 and/or of mass 17 from rod 16, there is no danger of rod 16 and/or mass 17 striking blades 9 and so impairing performance of rotor 3.

Moreover, being housed inside cavity 30, damper 15 is not subjected to aerodynamic forces which might prevent tuning it to said characteristic frequency value of the vibration produced by rotation of rotor 3.

Finally, damper 15 can be integrated easily in rotor 3, by being housed inside cavity 30 and, therefore, non-intrusive with respect to the other component parts of rotor 3.

The updating method according to the invention is particularly advantageous, by involving no alterations to an existing rotor 3 to house damper 15.

This is done, in fact, by simply fixing cup-shaped body 20 to shaft 6, fixing rod 16 to cup-shaped body 20, and fixing mass 17 to rod 16.

Clearly, changes may be made to rotor 3 and the updating method as described and illustrated herein without, however, departing from the protective scope as defined in the accompanying Claims.

The invention claimed is:

1. A rotor for a helicopter, comprising:
   a hub rotating about an axis and in turn comprising a number of blades; and
   an at least partly hollow drive shaft connectable to a drive of said helicopter and connected functionally to said hub to rotate the hub about said axis;
   and characterized by comprising vibration damping means in turn comprising a mass, and an elastically deformable member connected to said mass and supported by said shaft; said member extending at least partly inside said shaft, and being elongated parallel to said axis; and said mass vibrating, in use, at such a frequency as to oppose transmission to said shaft of the vibration produced by rotation of said hub and said blades and further comprising a supporting body interposed between said shaft and said member, and angularly integral with said shaft and said member.

2. A rotor as claimed in claim 1, characterized in that said supporting body comprises, at opposite axial ends of the supporting body, a seat engaged by said member, and an end surface fixed to said shaft.

3. A rotor as claimed in claim 1, characterized in that said member is a rod extending parallel to said axis, and having a first axial end engaged in said seat, and a second axial end opposite said first axial end and fixed to said mass; said rod also comprising an intermediate portion extending between said first and second axial end and through said end surface.

4. A rotor as claimed in claim 1, characterized in that said mass comprises a main body; and at least one plate connected releasably to said main body to adjust the vibration frequency of said mass.

5. A rotor as claimed in claim 1, characterized by comprising a flow deflector connected to said hub to direct along a predetermined path the airflow generated in use by rotation of said blades.

6. A rotor as claimed in claim 5, characterized in that said member and said mass are housed in a cavity defined by said flow deflector and said shaft; said cavity isolating said vibration damping means from said hub.

7. A rotor as claimed in claim 5, characterized in that said mass is housed in said flow deflector.

8. A rotor as claimed in claim 1, characterized in that said member, said supporting body, and said mass extend symmetrically about the axis.

9. A helicopter, characterized by comprising a rotor as claimed in claim 1.

10. A method for updating a rotor of a helicopter;

said rotor comprising:

a hub rotating about an axis and in turn comprising a number of blades; and an at least partly hollow drive shaft connectable to a drive of said helicopter and connected functionally to said hub to rotate the hub about said axis;

said method being characterized by comprising the steps of:

inserting a resilient deformable member at least partly inside said shaft, and securing it to said shaft;

interposing said member between said shaft and a mass; and interposing a supporting body between said shaft and said member, and angularly integral with said shaft and said member;

said member and said mass defining vibration damping means for damping vibration produced by rotation of said hub and said blades; and said mass vibrating, in use, at such a frequency as to oppose transmission to said shaft of the vibration produced by rotation of said hub and said blades.

* * * * *